Patented July 6, 1954

2,683,128

UNITED STATES PATENT OFFICE 2,683,128

POLYMERIC COMPOSITIONS

Gaetano F. D'Alelio, Pittsburgh, Pa., assignor to Koppers Company, Inc., a corporation of Delaware No Drawing. Application September 29, 1950, Serial No. 187,689

15 Claims. (Cl. 260—32.6)

This invention relates to the preparation of compositions of polymeric materials, and to the production of shaped articles therefrom. More specifically, the invention provides new and useful compositions of acrylonitrile polymers, and shaped articles therefrom. Moreover, it provides a method for preparing such shaped articles. The term "polymers" is intended herein to include copolymers.

Very useful polymers have been prepared from acrylonitrile with or without other polymerizable substances, for example, vinyl, vinylidene and other mono-ethylenic compounds, and conjugated diene compounds such as butadiene, etc. These acrylonitrile polymers possess desirable physical and chemical properties including toughness and solvent resistance to common organic solvents such as methyl or ethyl alcohol, acetone, ethyl ether, ethyl acetate, hydrocarbon solvents, chlorinated hydrocarbons and the like. Because of these properties, it has been considered desirable that these polymeric materials be fashioned into fibers, films, and other shaped articles.

In accordance with the present invention it has been found that new compositions useful for the production of shaped articles such as, for example, filaments, films and the like, may be prepared by treating acrylonitrile polymers with N,N,N',N'-tetramethyl urea or the other N,N-dimethyl-N',N'-dialkyl ureas described hereinafter. In addition the polymerization of the acrylonitrile, either alone or in the presence of other polymerizable materials, may be accomplished in the presence of N,N,N',N'-tetramethyl urea or the other tetra-alkyl ureas as designated herein. By employing the methods of this invention new fibers, films and the like having particularly desirable properties may be readily produced.

It has been known that certain copolymers containing less than 85% acrylonitrile are soluble in nitroalkanes, such as nitromethane. This is true when the comonomer has substituent groups of low secondary-valence bonding forces, such as acrylates, etc. However, if the comonomer or comonomers have substituent groups of high secondary-valence bonding forces, then the solvent resistance of the acrylonitrile copolymers approaches or is equivalent to that of polyacrylonitrile. Examples of monomers which have high secondary-valence bonding forces and which form acrylonitrile copolymers of high solvent resistance are methacrylonitrile, fumaronitrile, vinylidene chloride, beta-cyano-acrylamide, methyl beta-cyano-acrylate and itaconamide. Copolymers of these with acrylonitrile have strong solvent resistance regardless of the proportion of comonomers used, permitting the use of much less than 85% acrylonitrile without loss of solvent resistance. This is illustrated hereinafter by Examples II, III, and IV which show that acrylonitrile copolymers of 20–50% vinylidene chloride are insoluble in nitromethane and various other solvents but are soluble in N,N,N',N'-tetramethyl urea, etc.

It has been proposed to use concentrated aqueous solutions of inorganic salts such as lithium bromide, zinc chloride, sodium chloride and sodium sulfocyanide (Rein, U. S. Patent No. 2,140,921), or molten quaternary ammonium salts such as benzyl pyridinium chloride (Rein, U. S. Patent No. 2,117,210), in the preparation of compositions of acrylonitrile polymers. However, these compositions have been found generally unsatisfactory for use in the formation of yarns and films. The former type of solution, upon extrusion in coagulating baths, gives shaped articles that contain large amounts of the inorganic salts of the proposed solvent. The presence of the foreign materials in the resultant composition produces discontinuities which cause weakness and brittleness in the shaped articles. The compositions containing the quaternary ammonium salts are dark colored, indicating some decomposition or reaction of the polyacrylonitrile in the presence of the molten salt, and the films or filaments obtained from such solutions are generally extremely brittle, highly colored and very weak.

It has been proposed (Latham, U. S. Patent No. 2,404,714) that certain compounds containing the dimethyl carbamyl group may be used as solvents for acrylonitrile polymers containing at least 85% by weight of acrylonitrile only if the carbon content of the compound be within certain limits. These limits are set by the formula

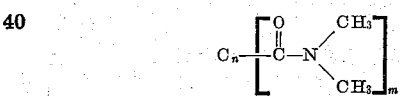

wherein $m$ and $n$ represent integers, $m$ being equal to or greater than 1, and $n$ being of such a value that the ratio $n/m$ is equal to or less than 1.5, except that when $m$ equals 1, $n$ must equal zero.

It has now been found that the new compositions of this invention may be produced by dissolving acrylonitrile polymers in tetra-alkyl ureas of the formula $(CH_3)_2NCONRR'$, wherein R and R' are alkyl groups of less than four carbon atoms, e. g., methyl, ethyl, propyl and isopropyl. These substituted ureas have been found very satisfactory for dissolving polyacrylonitrile, acrylonitrile copolymers containing at least 85 percent acrylonitrile, and acrylonitrile copolymers containing various proportions of the monomers listed above as having high secondary-valence bonding force.

It has also been found that certain other N,N-dimethyl-N',N'-dialkyl ureas in which the alkyl groups have four or more carbon atoms, e. g., amyl, hexyl, etc., have varying degrees of solvent powers depending on the particular alkyl groups. These latter compounds can be used quite satisfactorily for acrylonitrile copolymers having considerably lower solvent resistance than polyacrylonitrile. Moreover, these dimethyl dialkyl ureas can often be used as plasticizers or softeners for acrylonitrile polymers and copolymers.

With the N,N-dimethyl-N',N'-dialkyl ureas having alkyl groups of less than four carbon atoms there can be used auxiliary solvents such as N,N - dimethyl formamide, N,N - dimethyl acetamide, etc., and in certain cases with acrylonitrile polymers of lower solvent resistance, the auxiliary solvents can be N, N-diethyl formamide, N,N-diethyl acetamide, N,N-dipropyl formamide, nitromethane, nitroethane, the N,N-dimethyl-N',N'-dialkyl ureas in which the alkyl groups have four or more carbon atoms, etc.

This invention will be more fully described by the following examples although it is understood that the invention is not intended to be limited by these examples. These examples illustrate the use of N,N,N',N'-tetramethyl urea, etc. in preparing compositions of acrylonitrile polymers. In these examples "parts" of materials is intended to mean parts by weight.

Example I

A 5% by weight solution of polyacrylonitrile in N,N,N',N'-tetramethyl urea is prepared simply by adding 5 parts of the polymer to 95 parts of the tetramethyl urea at room temperature and stirring the mixture until solution is completed. More concentrated solutions, for example 20–25%, are readily prepared by heating a mixture of polymer and N,N,N',N'-tetramethyl urea at temperatures higher than room temperature, including the boiling temperature of the tetramethyl urea at atmospheric or superatmospheric pressure. These solutions are particularly useful in the preparation of fibers, films, etc.

Example II

A copolymer of 80 parts acrylonitrile and 20 parts vinylidene chloride is substantially insoluble in methyl alcohol, ethyl alcohol, acetone, methyl acetate, butyl acetate, benzene, cyclohexane, dioxan, monochlorobenzene, and cyclohexanone. Likewise it is also insoluble in ordinarily effective solvents such as nitromethane and nitroethane. A 10% solution of the same copolymer in N,N,N',N'-tetramethyl urea or in N,N-dimethyl-N',N'-diethyl urea is effected by stirring at room temperature. More concentrated solutions, for example, up to 20–25% or higher, are prepared by heating the mixtures to temperatures up to and including the boiling point of the tetramethyl urea. In some cases the solution is advantageously prepared under superatmospheric pressures. Fibers made from these copolymer compositions, heat-treated under tension for 1 hour at 150° C. and tested in boiling water show a shrinkage of about 3% maximum.

Example III

A copolymer of 60 parts of acrylonitrile and 40 parts vinylidene chloride behaves in the same manner as the 80–20 copolymer of Example II with regard to insolubility in the common organic solvents and in other highly polar solvents. However, solutions of this copolymer in N,N,N',N'-tetramethyl urea are prepared with no difficulty. Fibers from these compositions when heat-treated as in Example II show a maximum shrinkage of 2%. Tenacities of these fibers are in the range of 4–6 grams per denier, and elongations in the range of 12–20%, depending on the methods and conditions of treatment. The wet strengths of these fibers are practically equal to their dry strength.

Example IV

A copolymer of 50 parts acrylonitrile and 50 parts vinylidene chloride is insoluble in the common organic solvents and in nitromethane, and only very slightly soluble in certain cyclic ketones. It is very readily soluble, however, in N,N,N',N'-tetramethtyl urea. Such compositions may be used in the preparation of formed polymers which may be cold-drawn and heat-treated to produce molecularly oriented structures.

Example V

Copolymers of 95–90 parts of acrylonitrile and 5–10 parts of vinyl chloride may be dissolved in N,N,N',N'-tetramethyl urea. Fibers from these compositions when heat-treated under tension for one hour at 150° C. and when tested in boiling water show a maximum shrinkage of about 3%. Tenacities of these fibers are in the range of 4–6 grams per denier and elongations in the range of 12–20%, depending on the methods and conditions of treatment. The wet strengths of these fibers are practically equal to their dry strengths.

Example VI

A copolymer of 80 parts acrylonitrile and 20 parts styrene is insoluble in the solvents named in Example II. However, it is soluble in N,N,N',N'-tetramethyl urea. These compositions may be used in the preparation of formed polymers which may be cold-drawn and heat-treated to produce molecularly oriented structures.

Example VII

A copolymer of 85 parts of acrylonitrile and 15 parts of dimethyl itaconate is insoluble in nitromethane but is soluble in N,N,N',N'-tetramethyl urea. Cold-drawn films from such compositions when heat-treated at 150° C. show toughness and excellent ductility. They also show birefringence under crossed Nicol prisms.

Example VIII

A copolymer of 95 parts acrylonitrile and 5 parts acrylic acid shows the same solubility characteristics as indicated for the copolymers of Examples II and III. Compositions satisfactory for the preparation of fibers, films, foils, bristles, etc., are readily prepared in N,N,N',N'-tetramethyl urea.

Example IX

Ten parts N,N,N',N'-tetramethyl urea and 90 parts polyacrylonitrile are ball milled for sufficient time to produce a homogeneous mixture.

(a) This composition is moldable per se to produce uniform dense articles by standard molding processes using heat and pressure.

(b) Solutions of acrylonitrile polymers and copolymers are more readily prepared by dispersing such a pre-milled mixture of the polymer in additional N,N,N',N'-tetramethyl urea than with similar polymers not so treated. The use of preheated polymer permits the ready dispersion of the polymer in the solvent and shortens the time required for its solution.

The composition described in paragraph (a) of Example IX may be molded into cohesible structures, that is, it may be made cohesive under heat, pressure, or heat and pressure.

N,N,N',N'-tetramethyl urea is a preferred substituted urea for the practice of this invention. This compound can be prepared from dimethyl amine by reaction with a number of reagents such as phosgene, methyl chlorocarbonate, dialkyl carbonates, carbon dioxide and N,N-dimethyl carbamyl chloride. The other dimethyl dialkyl ureas mentioned above are easily prepared from N,N-dimethyl carbamyl chloride, $(CH_3)_2NCOCl$, which is an intermediate in the preparation of tetramethyl urea from phosgene and dimethyl urea and which is commercially available. By the reaction of $(CH_3)_2NCOCl$ with the proper dialkyl amine, any desired dimethyl dialkyl urea suitable for the practice of this invention can be prepared.

N,N,N',N'-tetramethyl urea has a boiling point of 177° C. The fact that this boiling point is higher than those of N,N-dimethyl formamide and N,N-dimethyl acetamide, 153° C. and 165° C. respectively, permits higher spinning temperatures and lower recovery losses. This higher boiling point also permits higher temperatures in hastening the dissolving process without the necessity of superatmospheric pressures.

The N,N-dimethyl-N',N'-dialkyl ureas described herein have been found to be good solvents and absorbents for gaseous acidic anhydrides such as sulfur dioxide, carbonic acid anhydride, etc. Apparently the high secondary-valence bonding forces which are believed to make these tetra-alkyl ureas such good solvents for acrylonitrile polymers also make the substituted ureas effective in retaining the gaseous anhydrides in solution. Moreover, when the tetra-alkyl ureas have sulfur dioxide, carbon dioxide, etc., dissolved therein the solvent power toward the acrylonitrile polymers is reduced. This fact may be used to advantage in certain instances to reduce the swelling and lumping effects of the solvents on acrylonitrile polymer particles. Usually when the acrylonitrile polymers are added to the tetra-alkyl ureas the solvent swells and softens the polymer particles and promotes a tendency for the particles to agglomerate and lump. This lumping makes stirring difficult and delays solution. However, the practice of decreasing the solvent power of the tetra-alkyl ureas by the use of gaseous acidic anhydrides, preferably those inert to the components and conditions of the solution such as sulfur dioxide and carbon dioxide, has been found to facilitate mixing and stirring since the lumping tendency of the polymer particles is thereby reduced. Then, as the temperature of the solvent is raised, the gaseous anhydride is gradually driven off thereby restoring the solvent power and permitting the tetra-alkyl urea to dissolve the polymer.

Fibers having especially advantageous properties, such as high orientation, high tenacity, high elastic recovery and low shrinkage, may be prepared from compositions of this invention by using acrylonitrile copolymers of vinyl and vinylidene chloride. These copolymers may be described as copolymers of acrylonitrile and at least one other compound of the formula

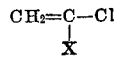

wherein X is hydrogen or chlorine. In these copolymers, as well as in the other acrylonitrile copolymers, the acrylonitrile content in the polymer molecule is preferably at least 50 percent, although in some cases copolymers having not less than 80 percent acrylonitrile are particularly advantageous.

For various purposes it may be desirable to chemically and physically modify the polymeric compositions of this invention by the presence of other materials. The N,N,N',N'-tetramethyl urea and other substituted ureas used in this invention are also useful in the preparation of mixtures of acrylonitrile polymers with various modifying agents such as other polymers, for example, polyvinyl chloride and polyvinylidene chloride, partial solvents or non-solvents, or mixtures of these, pigments, dyes, plasticizers, stabilizers, spinning agents, incrustation inhibitors, etc.

Typical of the copolymerizing monomers which may be used with acrylonitrile in addition to or in substitution for those already mentioned are: acrylic acids, esters and amides, including their alpha-methyl and alpha-chloro derivatives; maleic and fumaric acids, esters, and amides; itaconic acid and esters; vinyl aryls, such as styrene, vinyl naphthalene, vinyl diphenyl, vinyl fluorene, etc. and their alkyl, halogen, cyano, alkoxy nuclear substitution products such as, for example, o, m, and p-methyl-styrenes, dimethyl-styrenes, o, m, and p-chloro-styrenes, dichloro-styrenes, o, m, and p-cyano-styrenes, dicyano-styrenes, o, m, and p-methoxy-styrenes, mono- and di-ethyl-styrenes, vinyl methyl-naphthalenes, vinyl chloro-naphthalenes, vinyl methyl-chloro-naphthalenes, vinyl cyano-naphthalenes, etc.; alpha-methyl-styrene, alpha, para-dimethyl-styrene, isopropenyl-napthalenes, etc.; allyl esters and ethers, such as diallyl phthalate, diallyl maleate, allyl alloxy-acetate, etc.; vinyl fluoride; tetrafluoroethylene; chlorotrifluoroethylene; isobutylene, ethylene; vinyl pyridines, vinyl esters, vinyl ethers, vinyl carbazole, N-vinyl imides, etc.

The acrylonitrile polymers and copolymers may be prepared by any suitable polymerization method, such as the ammonium persulfate catalyzed polymerization of monomer or monomers dissolved or emulsified in water. Molecular weights of these polymers and copolymers are preferably within the range of 10,000 to 250,000, or even higher, although polymers having molecular weights between 40,000 and 150,000 may be used with particular advantage. However, polymers of molecular weight less than 10,000 may be used for other purposes, such as impregnants, solvent-resistant coatings, etc. The Staudinger equation permits evaluation of molecular weights by viscosity measurements:

$$\text{Molecular weight} = \frac{N_{sp}}{K_m C}$$

wherein $K_m = 1.5 \times 10^{-4}$, for many acrylonitrile polymers $$N_{sp} = \frac{\text{viscosity of solution}}{\text{viscosity of solvent}} - 1$$

and

C = The concentration of the polymer in the solvent expressed in molarity per 1000 ml. of solvent at 20° C.

The molecular weight of the polymer or copolymer is dependent on the concentration of monomer or monomers, the amount and type of catalyst, temperature of reaction, etc.

As mentioned above, the compositions of this invention are especially useful in the preparation of fibers, filaments, films, etc., either by dry spinning or by wet spinning into coagulating baths of water, glycerine, acetic acid, aqueous salt solutions or other suitable liquids or mixtures of liquids which are miscible with the tetramethyl urea but are non-solvents or precipitants for the dissolved polymers.

In many cases, the formed article may be cold-drawn when it is substantially free from the tetra-alkyl urea. In other cases a plasticizing effect may be obtained when the polymer contains small quantities, that is, 1–10% of tetramethyl urea, etc. With tetramethyl urea, etc. as plasticizers the formed polymer may be cold-drawn at a lower temperature than the corresponding acrylonitrile polymer free of plasticizer. Acrylonitrile polymers plasticized with N,N,N',N'-tetra-alkyl ureas, e. g. N,N,N',N'-tetramethyl urea, etc., in accordance with the practice of this invention are particularly adapted to the preparation of molded articles or extruded forms such as rods, tubing, etc. The formed articles of this invention may be cold-drawn up to 600 to 800% or more and thereafter heat-treated in the stretched form at temperatures of 125–185° C. but preferably at temperatures of 145–155° C.

Fibers obtained in accordance with the invention can be stretched to oriented structures of high tenacity and high elastic recovery. These stretched fibers exhibit characteristic X-ray patterns showing orientation along the fiber axis. Yarns made from these fibers may be used in making stockings and, because of their heat-resistance, may also be fashioned into more general, all-purpose fabrics such as for blouses, suits, skirts, etc.

The compositions of this invention are also suitable for use in the preparation of various other shaped articles and also for use as lacquers or coating compositions. Moreover, products obtained from these compositions are practically free of undesirable salts and especially impervious to moisture and solvents.

The subject matter of this application was disclosed in application Serial No. 69,623, filed January 6, 1949, and abandoned prior to the filing date of the present application.

What is claimed is:

1. A composition of matter comprising polymeric acrylonitrile containing in the polymer molecule at least 80% by weight of acrylonitrile, and a substituted urea of the formula (CH$_3$)$_2$NCONRR', wherein R and R' are alkyl groups of less than four carbon atoms.

2. A composition of matter comprising N,N,N',N'-tetramethyl urea and polyacrylonitrile.

3. A composition of matter comprising polyacrylonitrile dissolved in N,N,N',N'-tetramethyl urea.

4. A composition of matter comprising N,N,N',N'-tetramethyl urea and a polymer of acrylonitrile containing in the polymer molecule at least 80 percent by weight of acrylonitrile.

5. A composition of matter comprising a polymer of acrylonitrile dissolved in N,N,N',N'-tetramethyl urea, said polymer containing in the polymer molecule at least 80 percent by weight of acrylonitrile.

6. A composition of matter comprising N,N,N',N'-tetramethyl urea and a copolymer of acrylonitrile and at least one compound having the formula

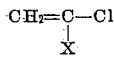

wherein X is a member of the class consisting of hydrogen and chlorine, said copolymer containing in the polymer molecule at least 80 percent by weight of acrylonitrile and said copolymer being dissolved in N,N,N',N'-tetramethyl urea.

7. A composition of matter comprising N,N,N',N'-tetramethyl urea and a copolymer of acrylonitrile and vinylidene chloride, said polymer containing in the polymer molecule at least 80 percent by weight of acrylonitrile.

8. A composition of matter as defined in claim 2, in which the polymer has a molecular weight between 10,000 and 250,000.

9. A fiber comprising N,N,N',N'-tetramethyl urea and polyacrylonitrile.

10. A fiber comprising N,N,N',N'-tetramethyl urea and a polymer of acrylonitrile containing in the polymer molecule at least 80 percent by weight of acrylonitrile.

11. A fiber comprising N,N,N',N'-tetramethyl urea and a copolymer of acrylonitrile and a compound having the formula

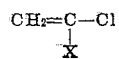

wherein X is a member of the class consisting of hydrogen and chlorine, said copolymer containing in the polymer molecule at least 80 percent by weight of acrylonitrile.

12. A cold-drawn, heat-treated fiber comprising N,N,N',N'-tetramethyl urea and an acrylonitrile polymer containing in the polymer molecule at least 80 percent acrylonitrile.

13. A composition of matter comprising polyacrylonitrile and a substituted urea of the formula (CH$_3$)$_2$NCONRR' wherein R and R' are alkyl groups of less than four carbon atoms.

14. A fiber comprising polyacrylonitrile and a substituted urea of the formula (CH$_3$)$_2$NCONRR' wherein R and R' are alkyl groups of less than four carbon atoms.

15. A cold-drawn, heat-treated fiber comprising polyacrylonitrile and a substituted urea of the formula (CH$_3$)$_2$NCONRR' wherein R and R' are alkyl groups of less than four carbon atoms.

References Cited in the file of this patent

UNITED STATES PATENTS

| Number | Name | Date |
| --- | --- | --- |
| 2,404,716 | Hansley | Nov. 4, 1944 |
| 2,460,578 | Houtz | Feb. 1, 1949 |
| 2,583,325 | D'Alelio | Jan. 22, 1952 |